United States Patent
Morita (10) Patent No.: US 11,128,346 B2
(45) Date of Patent: Sep. 21, 2021

(54) ANTENNA MODULE AND TRANSMISSION SYSTEM

(71) Applicant: CANON KABUSHIKI KAISHA, Tokyo (JP)

(72) Inventor: Jun Morita, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 97 days.

(21) Appl. No.: 16/264,750

(22) Filed: Feb. 1, 2019

(65) Prior Publication Data

US 2019/0245585 A1 Aug. 8, 2019

(30) Foreign Application Priority Data

Feb. 6, 2018 (JP) .............................. JP2018-019587

(51) Int. Cl.
*H04B 5/00* (2006.01)
*H02J 50/80* (2016.01)
*H02J 50/10* (2016.01)

(52) U.S. Cl.
CPC ............ *H04B 5/0037* (2013.01); *H02J 50/10* (2016.02); *H02J 50/80* (2016.02); *H04B 5/0081* (2013.01)

(58) Field of Classification Search
CPC .................................................. H04B 5/0037
USPC .......................................................... 307/104
See application file for complete search history.

(56) References Cited

U.S. PATENT DOCUMENTS

| 9,667,086 B2* | 5/2017 | Koyanagi | ............ H01M 50/209 |
| 9,859,598 B2 | 1/2018 | Morita | |
| 10,128,552 B2 | 11/2018 | Morita et al. | |
| 2010/0237709 A1* | 9/2010 | Hall | ............ B60L 53/64 307/104 |
| 2016/0141882 A1* | 5/2016 | Ichikawa | ............ H04B 5/0081 307/104 |

FOREIGN PATENT DOCUMENTS

| CN | 102820539 A | 12/2012 |
| CN | 103812228 A | 5/2014 |
| CN | 103918192 A | 7/2014 |
| CN | 105308829 A | 2/2016 |
| CN | 106992362 A | 7/2017 |
| JP | 2014096612 A | 5/2014 |
| KR | 20160103274 A | 9/2016 |

OTHER PUBLICATIONS

Notice on the First Office Action issued by the National Intellectual Property Administration of the People's Republic of China dated Mar. 3, 2021 in corresponding CN Patent Application No. 201910106324.6, with English translation.

* cited by examiner

*Primary Examiner* — Joseph Chang
(74) *Attorney, Agent, or Firm* — Carter, DeLuca & Farrell LLP (57) ABSTRACT

An antenna module comprises a circuit substrate, a communication coupler disposed on the circuit substrate, and configured to wirelessly communicate data by electromagnetic coupling with another communication coupler, a power transmission coil disposed on the circuit substrate and configured to wirelessly transmit power by electromagnetic coupling to another power transmission coil, and a conductive plate disposed on the circuit substrate, and overlapping on at least a portion of the communication coupler as viewed from a direction orthogonal to the substrate.

15 Claims, 7 Drawing Sheets

ANTENNA MODULE AND TRANSMISSION SYSTEM

BACKGROUND OF THE INVENTION

Field of the Invention

The present invention relates to a technique for performing wireless power transmission and wireless communication.

Description of the Related Art

Onto a rotatable part of a device such as a robot hand or a network camera, it is possible to mount, for example, a wire harness for transmitting power and data. In addition, in order to resolve a problem such as a cable being abraded by rotation or a functional restriction such as a limitation for a rotatable range, a configuration for wirelessly transmitting power and data in the rotatable part of the device can be considered. However, in such a device, there are limitations on space for mounting a module for transmitting power and data, and it is desirable to miniaturize the module. Japanese Patent Laid-Open No. 2014-96612 proposes a configuration for an antenna module that integrates a communication coupler for data transmission and a power transmission antenna for power transmission.

In a case of using the antenna module recited in Japanese Patent Laid-Open No. 2014-96612, there is a concern that a data communication speed will decrease due to an effect on the antenna module from noise emitted from other units inside the device, such as harmonic frequency noise generated from a communication circuit and a power supply circuit.

SUMMARY OF THE INVENTION

According to one aspect of the present invention, there is provided an antenna module which comprises: a circuit substrate; a communication coupler disposed on the circuit substrate and configured to wirelessly communicate data by electromagnetic coupling with another communication coupler; a power transmission coil disposed on the circuit substrate and configured to wirelessly transmit power by electromagnetic coupling to another power transmission coil; and a conductive plate disposed on the circuit substrate, and overlapping on at least a portion of the communication coupler as viewed from a direction orthogonal to the substrate.

Further features of the present invention will become apparent from the following description of exemplary embodiments (with reference to the attached drawings).

DESCRIPTION OF THE EMBODIMENTS

[System Configuration]

Figure 1:
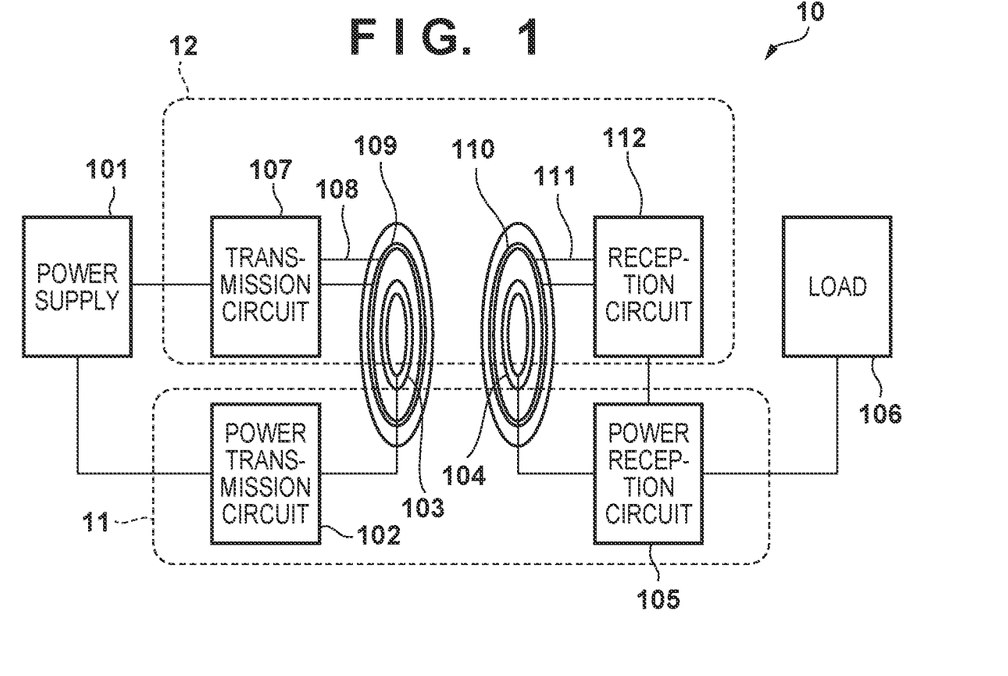
FIG. 1 is a configuration block diagram of a transmission system 10.

Description is given below regarding embodiments of the present invention with reference to the drawings. FIG. 1 illustrates a configuration block diagram of a transmission system 10 in an embodiment. The transmission system 10 is configured from a power transmission mechanism 11 that uses inductive coupling, a communication mechanism 12 that uses electromagnetic coupling, a power supply 101, and a load 106. In the following embodiment, electromagnetic coupling comprises both of electric field coupling and inductive coupling. In other words, wireless communication by the communication mechanism 12 may be performed by the electric field coupling, may be performed by inductive coupling, and may be performed by both of electric field and inductive coupling. In addition, inductive coupling comprises various methods such as an electromagnetic induction method, and a magnetic resonance method. In the transmission system 10, from the perspective of a transmitter and a receiver, a transmitter is configured from the power supply 101, a transmission circuit 107, a power transmission circuit 102, differential transmission paths 108, a power transmission antenna 103, and the transmission coupler 109. In addition, a receiver is configured from the load 106, a reception circuit 112, a power reception circuit 105, differential transmission paths 111, a power reception antenna 104, and the reception coupler 110.

The power transmission mechanism 11 is configured from the power transmission circuit 102, the power transmission antenna 103, the power reception antenna 104, and the power reception circuit 105. The power transmission circuit 102, the power transmission antenna 103, the power reception antenna 104, and the power reception circuit 105 may have publicly known configurations that are used when they are employed for electromagnetic induction or a magnetic resonance method. Specifically, the power transmission circuit 102 has an inverter circuit and a switch unit, uses the inverter circuit to convert a direct-current voltage supplied from the power supply 101 to an alternating-current voltage of a frequency suitable to power transmission, and outputs the alternating-current voltage to the coil-shaped power transmission antenna 103 via the switch unit. In other words, the power transmission circuit 102 converts a direct current to an alternating current, and generates an alternating current magnetic field by the power transmission antenna 103. The coil-shaped power reception antenna 104 performs power reception via the alternating current magnetic field generated by the power transmission antenna 103. The power reception circuit 105 has a rectification circuit and a voltage conversion circuit, uses the rectification circuit to convert the alternating current to a direct current, uses the voltage conversion circuit to convert the direct current to a voltage suitable to the load 106 and the reception circuit 112, and supplies direct-current power to the load 106 and the reception circuit 112.

The communication mechanism 12 is configured from the transmission circuit 107, the differential transmission paths 108, the transmission coupler 109, the reception coupler 110, the differential transmission paths 111, and the reception circuit 112. The transmission circuit 107 generates differential signals (differential data signal) that have opposite phases to each other, and outputs them to the differential transmission paths 108. Specifically, the transmission circuit 107 has a differential driver, and uses the differential driver to generate binary-value digital signals, indicating "1" and "0", as differential data signals. For convenience, one differential data signal is referred to as a positive electrode and the other is referred to as a negative electrode, and the positive electrode and the negative electrode for the differential data signal are transmitted to the transmission coupler 109 by one of the differential transmission paths 108 and other of the differential transmission paths 108. Note that the positive electrode and the negative electrode for the differential data signal are electrically equivalent aside from phase, and how to indicate polarity differs by system. The differential transmission paths 108 transmit differential data signals outputted from the transmission circuit 107. The differential transmission paths 108 may be coplanar lines or microstrip lines formed by a substrate or a flexible hose, and may be coaxial cables, for example.

The transmission coupler 109 is configured from an inside transmission coupler and an outside transmission coupler, and the positive electrode and the negative electrode of the differential data signals generated by the transmission circuit 107 are respectively connected to the inside transmission coupler and the outside transmission coupler. The transmission coupler 109 and the reception coupler 110 are configured as concentric circles, and are mainly coupled by an electric field component. When differential data signals are inputted to the transmission coupler 109, by electromagnetic coupling, voltages occur at the reception coupler 110 in accordance with signal voltages of the differential data signals. The differential transmission paths 111 are connected to the reception coupler 110. The differential transmission paths 111 transmit the signal voltages generated at the reception coupler 110 to the reception circuit 112. The reception circuit 112 shapes the differential data signals, which have degraded by passing through the transmission coupler 109 and the reception coupler 110, to shapes close to the signal waveforms outputted by the transmission circuit 107.

Note that, in FIG. 1, the arrangement of the transmission coupler 109 and the power transmission antenna 103 is illustrated with the transmission coupler as outside and the power transmission antenna 103 as inside, but these may be reversed. It is similar for the reception coupler 110 and the power reception antenna 104.

In addition, in FIG. 1, the transmission coupler 109 and the power transmission antenna 103 are illustrated to be configured on one substrate, but each may be configured on a separate substrate. It is similar for the reception coupler 110 and the power reception antenna 104. Furthermore, the substrate may be a typical FR4 substrate, and may be a substrate with a low dielectric that uses fluorine or the like.

In addition, in FIG. 1, the communication unit 107 is illustrated as being for unidirectional communication, the communication unit 107 may be configured for bidirectional communication by adding a communication channel. In such a case, a transmission coupler, a reception coupler, and a power transmission antenna are arranged on the antenna substrate for the power transmission side (the left side of FIG. 1), and a transmission coupler, a reception coupler, and a power reception antenna are arranged on the antenna substrate for the power reception side (the right side of FIG. 1). The transmission circuit 107 and the reception circuit 112 would both be transmission/reception circuits, and each circuit would be connected via the transmission couplers, the reception couplers, and the differential transmission paths. Note that configuration may be taken such that it is possible to switch circuit configurations to enable the same coupler to be used as either a transmission coupler or a reception coupler.

Figure 2:
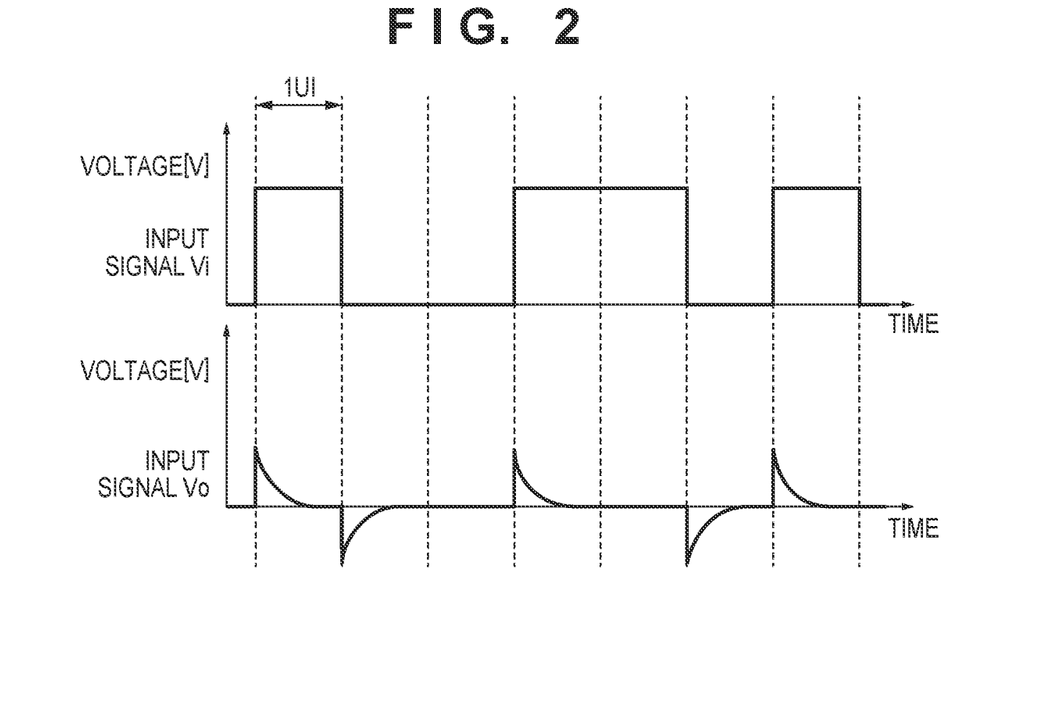
FIG. 2 is a view which illustrates a signal waveform of an input signal which is inputted to a transmission coupler 109 and an output signal which is outputted by a reception coupler 110.

FIG. 2 illustrates an input signal Vi that is outputted by the transmission circuit 107 and inputted to the transmission coupler 109, and a signal waveform for each UI (Unit Interval) for an output signal Vo outputted by the reception coupler 110 in accordance with electromagnetic coupling, when the input signal Vi is inputted. As described above, the transmission circuit 107 uses the differential driver to generate the binary-value digital signals indicating "1" and "0" as differential data signals, and outputs the differential data signals to the differential transmission paths 108. Let the output impedance of the differential driver in the transmission circuit 107 at this time be Zo. The output impedance Zo is set to approximately 100Ω, for example. The differential transmission paths 108 transmit the differential data signals outputted by the transmission circuit 107, and output them to the transmission coupler 109 as an input signal Vi. At this time, it is desirable that the differential transmission paths 108 are adjusted by characteristic impedance close to the output impedance Zo of the transmission circuit 107.

Description is given here regarding a reason why the output signal Vo outputted in accordance with electromagnetic coupling takes the form illustrated by FIG. 2. A characteristic of transmission from the transmission coupler 109 to the reception coupler 110 is typically that a degree of coupling is low in a low frequency band, and the degree of coupling becomes high in a high frequency band. In other words, the transmission characteristic is one that is similar to an HPF (High Pass Filter). Accordingly, the high-frequency component is transferred, and as illustrated, the output signal Vo has a waveform like an inexact differential of the input signal Vi.

The differential transmission paths 111 transfers the output signal Vo outputted by the reception coupler 110, and outputs to the reception circuit 112. At this time, similarly for the differential transmission paths 108, it is desirable that the differential transmission paths 111 are adjusted by characteristic impedance close to the output impedance Zo of the transmission circuit 107.

The reception circuit 112, to which the output signal Vo is inputted, reconstructs the binary-value digital signals indicating "1" and "0" that were outputted by the transmission circuit 107 by performing signal shaping on the output signal Vo. The signal shaping can be realized by a well-known hysteresis comparator, for example. At this time, it is desirable that the reception circuit 112 is terminated by terminating resistance close to the output impedance Zo of the transmission circuit 107. Data transmission by electromagnetic coupling is achieved by the foregoing configuration and operations.

Note that, in the foregoing description, description was made for the case where electrical signals (specifically the differential data signals generated by the transmission circuit 107), which are baseband signals not requiring modulation processing or demodulation processing, are transmitted and received between the transmission coupler 109 and the reception coupler 110. Because a case of using baseband signals does not require demodulation or modulation processing for an electrical signal, it is possible to reduce a circuit scale. However, limitation is not made to this, and carrier wave communication that uses modulated signals may be performed by modulating a carrier wave transmitted from the transmission coupler 109 to the reception coupler 110 in accordance with an electrical signal generated by the transmission circuit 107, for example.

First Embodiment: Configuration of Antenna Substrate for Suppressing Mixed-in Noise In a case of implementing the transmission system 10 illustrated in FIG. 1 in a rotatable part of a network camera, for example, there are very high restrictions on implementation space. Accordingly, it is necessary to configure, to be miniaturized and thin, an antenna/coupler integrated coupler (hereinafter referred to as an antenna substrate or an antenna module) on which a power transmission antenna (the power transmission antenna 103 and the power reception antenna 104 in FIG. 1) and a communication coupler (the transmission coupler 109 and the reception coupler 110 in FIG. 1) are arranged in the same plane, and a circuit substrate. Furthermore, it is necessary for the antenna substrate and the circuit substrate to be proximate.

Figure 3:
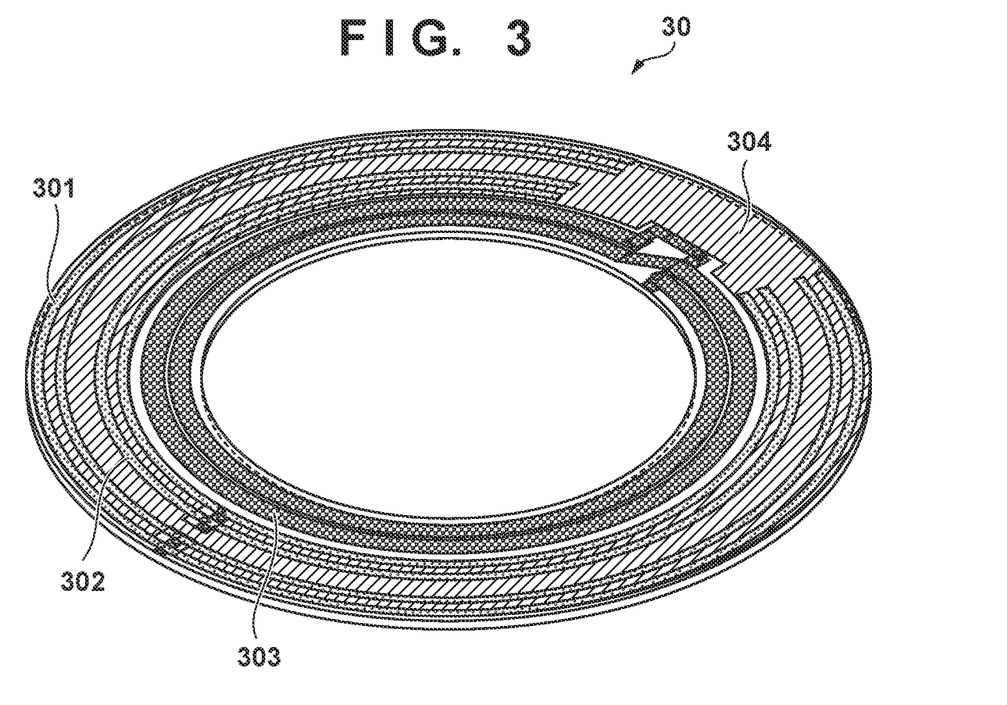
FIG. 3 illustrates a configuration of an antenna substrate 30 in a first embodiment.

Accordingly, mounting a shield member which is a plate-shaped conductor member near the communication coupler is proposed. The conductor member is mounted to overlap at least a portion of the communication coupler in a predetermined direction for a viewpoint orthogonal to the substrate. FIG. 3 illustrates a configuration of an antenna substrate 30 in a first embodiment. The antenna substrate 30 is configured from a transmission coupler 301, a reception coupler 302, a power transmission antenna 303, and a shield member (a shield pattern) 304, and the shield member 304 is mounted on a back surface of the transmission coupler 301 and the reception coupler 302 in the substrate. In addition, the transmission coupler 301 which has an arc shape, the reception coupler 302 which has an arc shape, and the power transmission antenna 303 which has a ring shape are arranged in concentric circles in the antenna substrate. Note that the transmission coupler 301 and the reception coupler 302 may be ring shaped. Because the antenna substrate 30 is provided with both of the transmission coupler 301 and the reception coupler 302, bidirectional communication is possible by having two of the antenna substrate 30 face one another as illustrated in FIG. 1. For the power transmission antennas 303 respectively provided in the two facing antenna substrates 30, one functions as a power transmission antenna, and the other functions as a power reception antenna. However, the configuration of an antenna module is not limited to what is illustrated. For example, configuration may be taken such one-way communication and power transmission is performed by the transmission coupler 301 and a power transmission antenna 303 being arranged in one antenna module, and the reception coupler 302 and a power transmission antenna 303 being arranged in the other antenna module. In addition, in FIG. 3, the transmission coupler 301 and the reception coupler 302 are each configured by a pair of electrodes to enable differential communication, but limitation is not made to this, and single-ended communication may be performed by configuring each of the transmission coupler 301 and the reception coupler 302 by one electrode. In addition, illustration is made in FIG. 3 for where the communication coupler, the power transmission antenna, and the shield member are configured on one substrate, but at least one of these may be configured on a different substrate.

As illustrated, by the shield member 304 being mounted, it is possible to reduce noise (for example, harmonic noise generated from the transmission circuit 107, the reception circuit 112, and the power supply 101, or noise generated from another unit inside the product) that mixes in communication by the transmission coupler 301 and the reception coupler 302. In particular, in a case of performing communication that uses a high-frequency baseband signal, because noise from an external unit on the transmission coupler 109 and the reception coupler 110 has a large effect on communication precision, a noise suppression effect by the shield member 304 is large. Note that, in FIG. 3, the shield member 304 is arranged so as to overlap both of the transmission coupler 301 and the reception coupler 302 viewed from a direction orthogonal to the substrate, but limitation is not made to this, and the shield member 304 may be arranged so as to overlap only one coupler. However, considering that generally a reception coupler is more affected by noise in comparison to a transmission coupler, by mounting the shield member so that it overlaps at least the reception coupler, it is possible to more appropriately reduce the effect of noise. In addition, the shield member 304 may be arranged so as to only overlap a part of the transmission coupler 301 and/or the reception coupler 302 seen from a direction orthogonal to the substrate. In addition, the shield member 304 may be mounted on only one of two opposing antenna modules.

Figure 4:
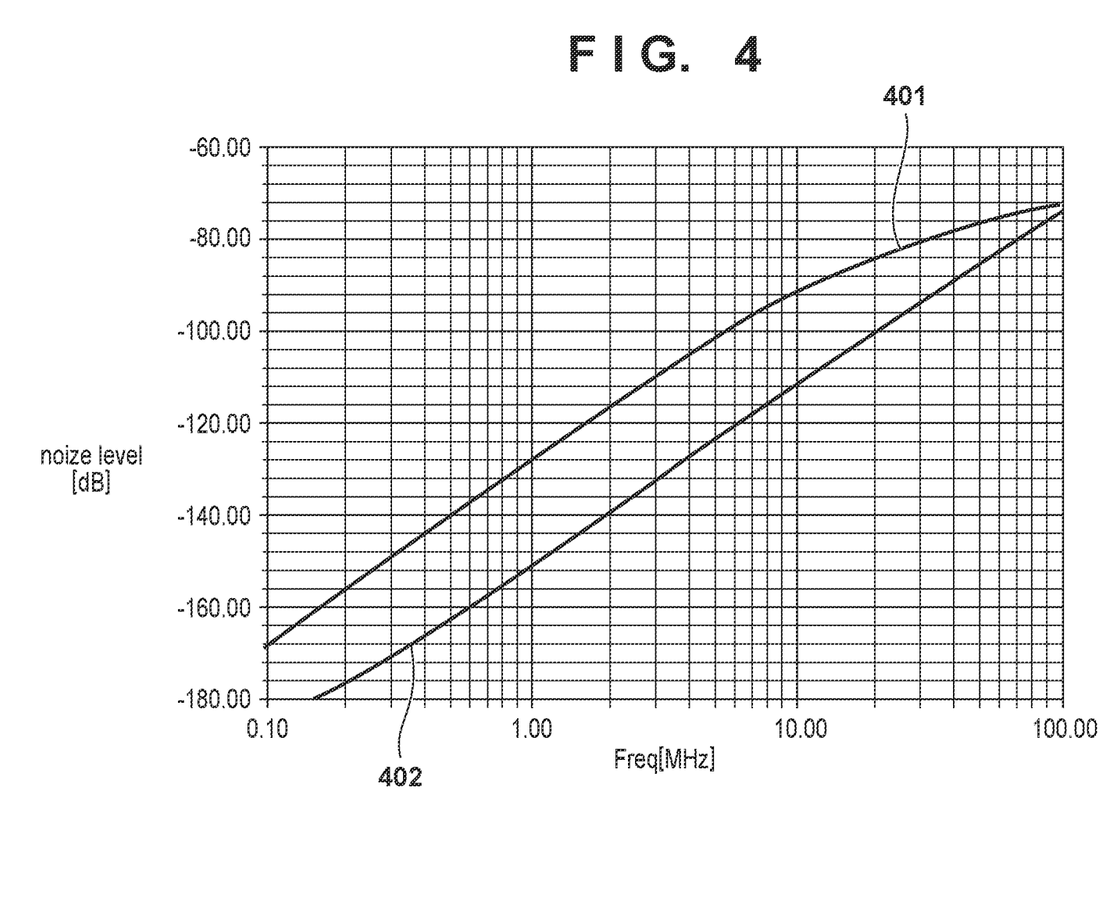
FIG. 4 illustrates the results of simulating a noise level that mixes with a reception coupler onto which a shield member has been mounted, and a reception coupler onto which a shield member has not been mounted. t

FIG. 4 illustrates the results of simulating a noise level that mixes with communication by a reception coupler onto which a shield member has been mounted, and communication by a reception coupler onto which a shield member has not been mounted. The abscissa indicates frequency (Freq [MHz]), and the ordinate indicates a noise level (noise level [dB]). In this simulation, harmonic frequencies generated from a circuit substrate close to the reception coupler has been set as a noise source. In addition, the range of frequencies illustrated in the abscissa of FIG. 4 is 0.1 to 100 MHz, which is primarily used in communication by electromagnetic coupling.

In FIG. 4, a characteristic 401 indicates a characteristic of a noise level that mixes with communication by the reception coupler onto which a shield member has not been mounted, and a characteristic 402 indicates a characteristic of a noise level that mixes with communication by the reception coupler onto which a shield member has been mounted. As can be seen from FIG. 4, when the characteristic 401 and the characteristic 402 are compared in the frequency band of up to 100 MHz the characteristic 402 for the case where a shield member is mounted has a lower noise level in comparison to the characteristic 401. In other words, by mounting a shield member on the antenna substrate, a noise suppression effect is obtained.

Figure 5A:
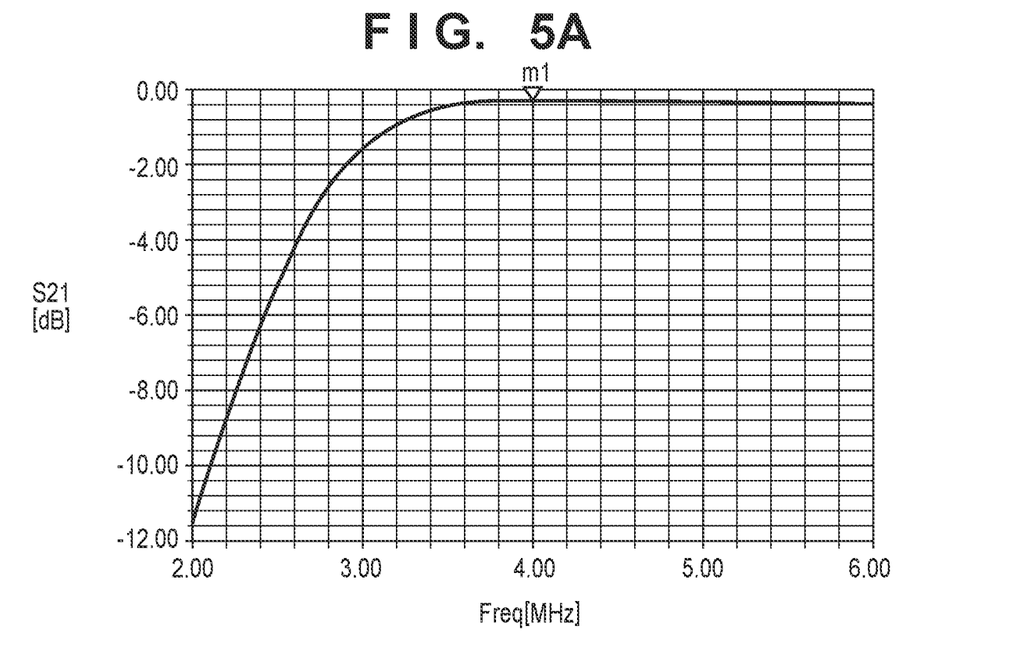
FIG. 5A illustrates the results of simulating a power transmission efficiency when the antenna substrate 30 is used according to the first embodiment.
Figure 5B:
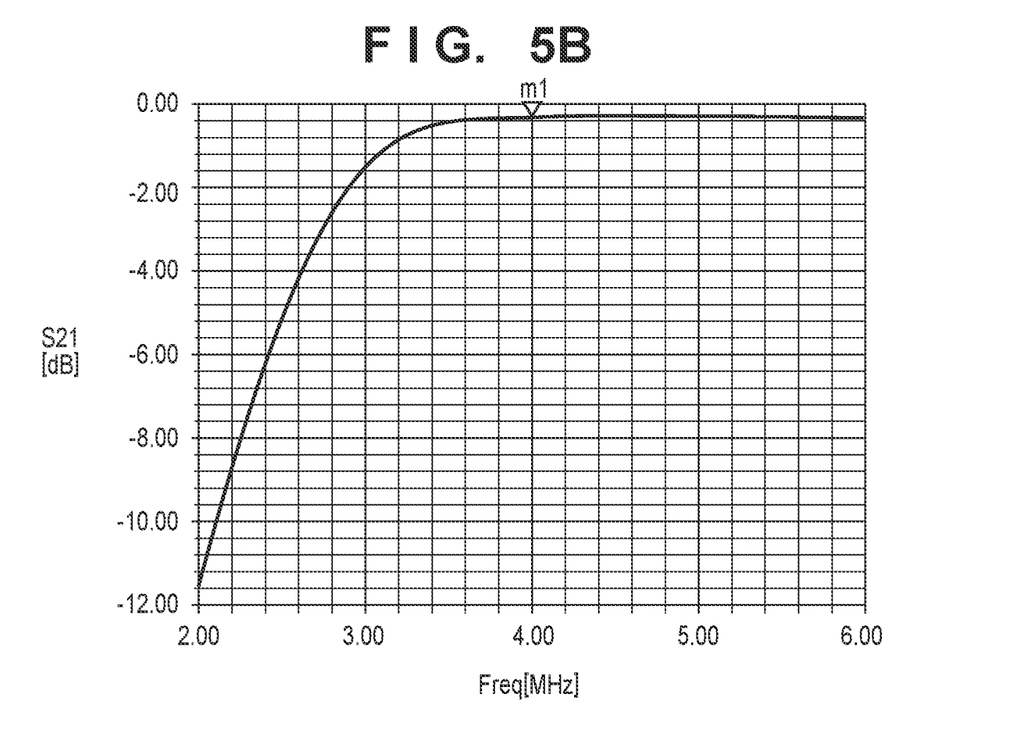
FIG. 5B illustrates the results of simulating a power transmission efficiency when an antenna substrate in which a shield member is not mounted is used.

Next, FIG. 5A illustrates the results of simulating power transmission efficiency for when power transmission is performed after arranging the antenna substrates 30 (one antenna substrate 30 is illustrated in FIG. 3) to face one another. In addition, as a comparison target, FIG. 5B illustrates the results of simulating power transmission efficiency when power transmission is performed after arranging antenna substrates, on which shield members are not mounted, to face one another. In both of FIG. 5A and FIG. 5B, the abscissa indicates frequency (Freq [MHz]), and the ordinate indicates a transmission coefficient (S21 [dB]) between the antennas which transmit/receive power. Here, attention is given for a case where a frequency of the alternating current power for power transmission is 4 MHz.

In FIG. 5A, the transmission coefficient at 4 MHz is −0.323 dB for the case where the shield member is mounted. A transmission coefficient of −0.323 dB converts to a power transmission efficiency of 92.8%. In contrast, in FIG. 5B, the transmission coefficient at 4 MHz is −0.14 dB for the case where the shield member is not mounted. A transmission coefficient of −0.14 dB converts to a power transmission efficiency of 96.7%. In this fashion, the power transmission efficiency for the case where the shield member is mounted (92.8%) is lower than the power transmission efficiency for the case where the shield member is not mounted (96.7%). Accordingly, in order to suppress a decrease of power transmission efficiency by mounting the shield member, configuration may be taken so that the shield member does not influence power transmission by having the shield member be separated a sufficient distance from an antenna for power transmission.

Second Embodiment: Shield Configuration for Realizing Mixed Noise Suppression and High-Efficiency Power Transmission In a case of using the antenna substrate 30 illustrated in the first embodiment, by having a shield member be separated a sufficient distance from the antenna for power transmission, it is possible to achieve both of a noise suppression effect and high power transmission efficiency. However, as described above, considering that there are significant space restrictions when mounting something on a rotatable part such as a network camera, there are cases where it is difficult to have a shield member be separated a sufficient distance from the antenna for power transmission.

Figure 6:
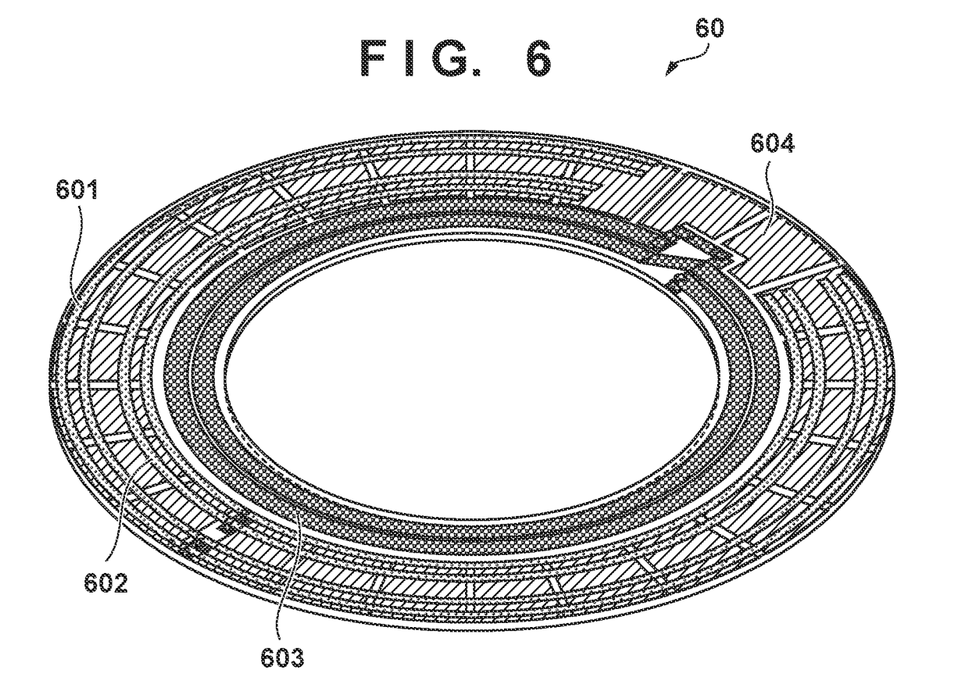
FIG. 6 illustrates a configuration of an antenna substrate 60 according to a second embodiment.

Accordingly, a configuration of an antenna substrate that enables power transmission efficiency to be maintained while keeping a noise suppression effect due to mounting a shield member is proposed. FIG. 6 illustrates a configuration of an antenna substrate 60 according to a second embodiment. The antenna substrate 60 is configured from a transmission coupler 601, a reception coupler 602, a power transmission antenna 603, and a shield member 604, and the shield member 604, which is slitted, is mounted on a back surface of the transmission coupler 601 and the reception coupler 602 in the substrate. As illustrated, in the shield member 604, slits are configured in directions from an inside corresponding to a hole portion of the antenna substrate to the outside of the antenna substrate (in directions from an inner circumference to an outer circumference), and portions of the shield member 604 other than the slits are mounted to overlap with the transmission coupler 601 and the reception coupler 602 as seen from a direction orthogonal to the substrate. In other words, the shield member 604 is configured from a plurality of conductive plates that are disposed in order by opening spaces in circumferential directions of the antenna substrate. Each the conductive plate overlaps a different portion of the transmission coupler 601 or the reception coupler 602 seen from a direction orthogonal to the substrate. A slit width is approximately 1 mm, for example. In addition, although there are a plurality of slits in FIG. 6, there is no limit to the number thereof, and there may be one or more slits. In addition, a slit may be formed in a direction that is different to a circumferential direction of the shield member 604, and there is no limitation to forming a slit in a direction orthogonal to the circumferential direction. In addition, illustration is made in FIG. 6 for where the communication coupler, the power transmission antenna, and the shield member are configured on one substrate, but at least one of these may be configured on a different substrate.

Figure 7:
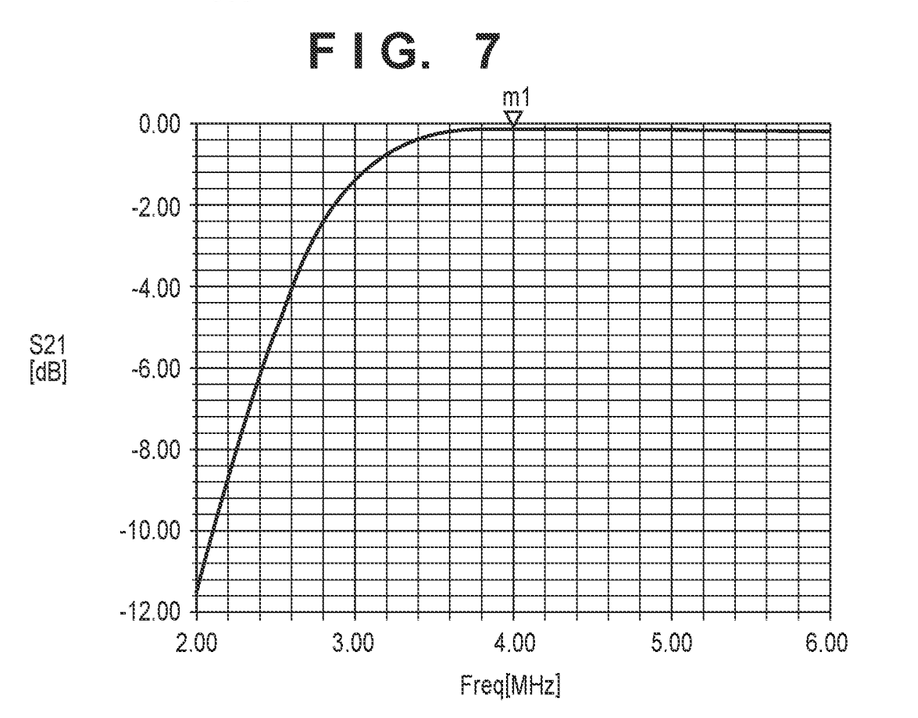
FIG. 7 illustrates the results of simulating a power transmission efficiency when the antenna substrate 30 according to the first embodiment is used.

Next, FIG. 7 illustrates the results of simulating power transmission efficiency for when power transmission is performed after arranging antenna substrates 60 (one antenna substrate 60 is illustrated in FIG. 6) to face one another. In FIG. 7, the abscissa indicates frequency (Freq [MHz]), and the ordinate indicates a transmission coefficient (S21 [dB]) between the antennas which transmit/receive power. Similarly to FIG. 4, attention is given for a case where a frequency of the alternating current power for power transmission is 4 MHz. In FIG. 7, the transmission coefficient at 4 MHz is −0.16 dB for the case where a slitted shield member is mounted. A transmission coefficient of −0.16 dB converts to a power transmission efficiency of 96.3%. Because the power transmission efficiency is 92.8% for the case where the shield member with no slits described in the first embodiment is mounted (FIG. 5A), it is understood that the power transmission efficiency improves by inserting slits into the shield member.

Figure 8:
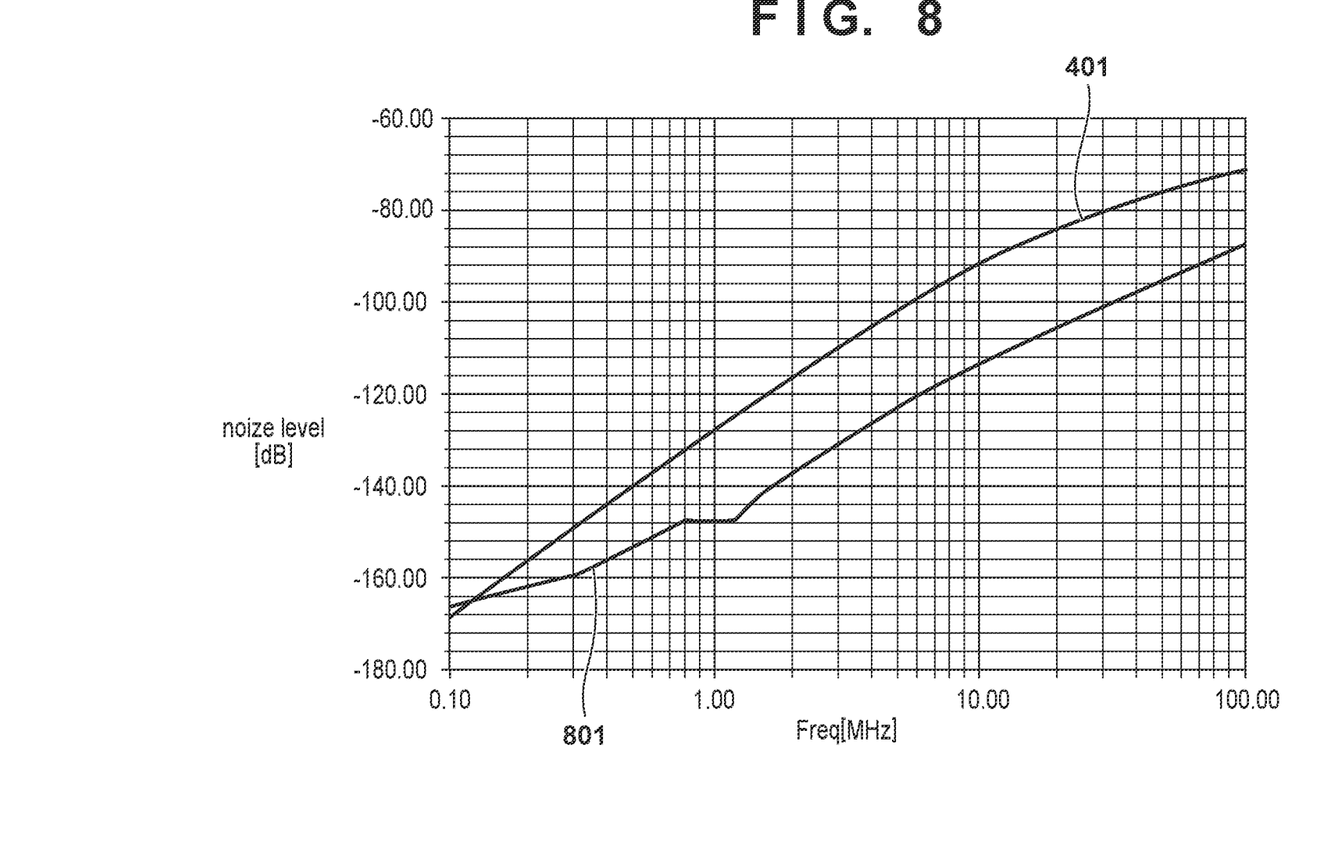
FIG. 8 illustrates the results of simulating a noise level that mixes with a reception coupler onto which a slitted shield member has been mounted, and a reception coupler onto which a shield member has not been mounted.

FIG. 8 illustrates the results of simulating a noise level that mixes with communication by a reception coupler onto which a slitted shield member has been mounted, and communication by a reception coupler onto which a shield member has not been mounted. The abscissa indicates frequency (Freq [MHz]) and the ordinate indicates a noise level (noise level [dB]), and a frequency range indicated by the abscissa is set as 1 to 100 MHz which is primarily used in communication by electromagnetic coupling. In FIG. 8, the characteristic 401 indicates a characteristic of a noise level that mixes with communication by the reception coupler onto which a shield member has not been mounted, and a characteristic 801 indicates a characteristic of a noise level that mixes with communication by the reception coupler onto which a slitted shield member has been mounted. As can be seen from FIG. 8, when the characteristic 401 and the characteristic 801 are compared in the frequency band of up to 100 MHz the characteristic 801 for the case where a slitted shield member is mounted has a lower noise level in almost all frequency bands in comparison to the characteristic 401. In other words, by mounting a slitted shield member to an antenna substrate, a noise suppression effect in a wide frequency band is obtained. Although description was given in the present embodiment by envisioning a slit width as approximately 1 mm, because there is no problem if a magnetic field component does not flow to the shield member, a similar effect is obtained even with a width of approximately 0.1 mm, for example.

Other Embodiments

Although description was given in the foregoing embodiments regarding a donut-shaped antenna substrate whose central portion is a cavity, an antenna substrate of a shape having no cavity in a central portion thereof may be used. In addition, description was given in the foregoing embodiments regarding, when mounting an antenna substrate on a rotation unit such as a network camera or a robot hand, a case of forming the antenna substrate as a circle in order to increase stability of communication and power transmission at a time of rotation. However, limitation is not made to this, and an antenna substrate of a different shape such as a square or a rectangle may be used. In addition, although description was given in the foregoing embodiments for an example of configuring communication couplers (a transmission coupler and a reception coupler) and a power transmission antenna as concentric circles, but an arrangement of the communication couplers and the power transmission antenna on a substrate is not limited to this. For example, the communication couplers and the power transmission antenna may be arranged to surround a concentric portion on the antenna substrate in any shape.

Figure 9A:
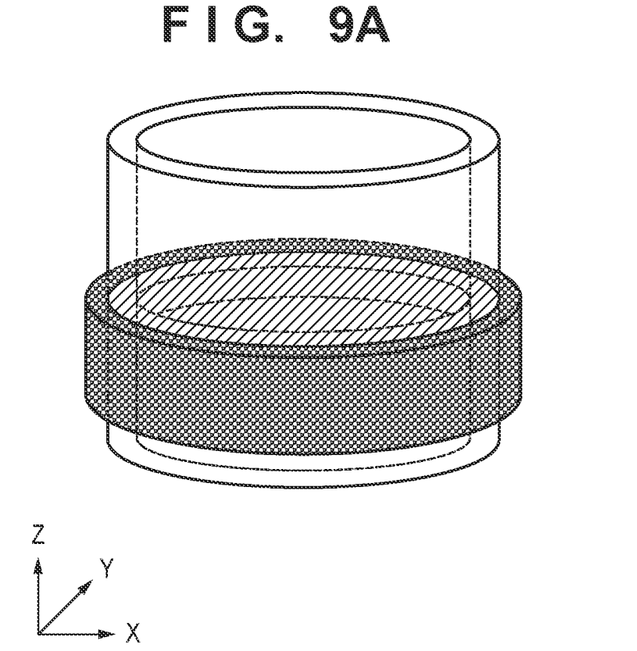
FIGS. 9A to 9B illustrate another embodiment of an antenna substrate.
Figure 9B:
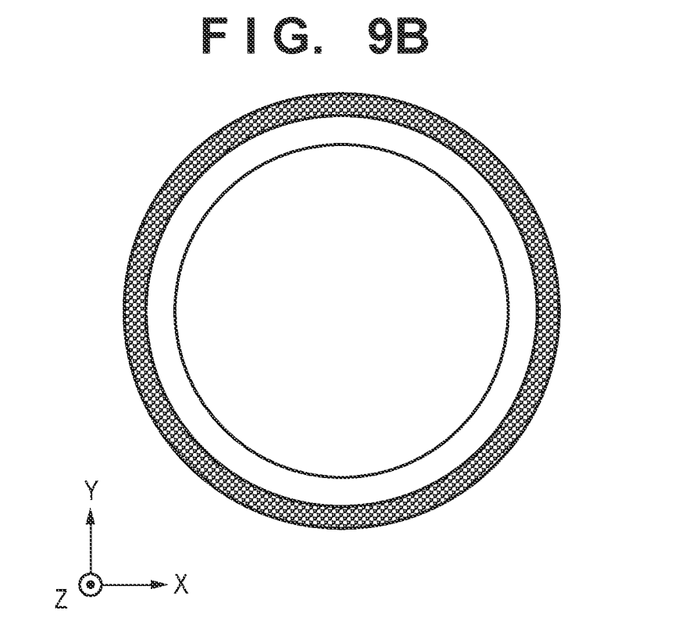

In addition, description was made in the foregoing embodiments regarding a planar antenna substrate in which the power transmission antenna and the communication coupler are arranged in the same plane. However, arrangement of the power transmission antenna and the communication couplers is not limited to a planar arrangement. FIGS. 9A to 9B illustrate another embodiment of an antenna substrate. FIG. 9A illustrates a cylindrical shape antenna substrate wound onto a columnar member (a cylindrical member in the figure). The power transmission antenna and the communication couplers may be arranged in concentric circles on an inner circumference or an outer circumference of the cylindrical antenna substrate, for example. Note that, in such a case, it is desirable that the substrate on which the power transmission antenna and the communication coupler are arranged can be bent as with a flexible substrate. In addition, the effect of noise can be suppressed by arranging a shield member on a back surface of a communication coupler as with the foregoing embodiments, even in this cylindrical antenna substrate. Furthermore, a reduction of power transmission efficiency can be suppressed by providing slits in the shield member. The slits in this case can be configured in a direction (a direction that follows a side surface of the columnar member) parallel to the axis of the cylindrical antenna substrate, for example.

In addition, although harmonic frequencies generated from a circuit substrate close to a communication coupler were used as a noise source in the simulations (FIG. 4 and FIG. 8) described in the foregoing embodiments, by applying the foregoing embodiments it is also possible to suppress the effect of other noise such as harmonic frequencies generated by an electronic product close to a communication coupler.

In addition, in the embodiments described above, one end of a communication coupler (the transmission coupler 301, the reception coupler 302, the transmission coupler 601, and the reception coupler 602) was given as open as illustrated in FIG. 3 and FIG. 6, but each communication coupler may have a configuration in which it is terminated by a respective characteristic impedance. In addition, although description was given in the foregoing embodiments by taking a shield member which is a plate-shaped conductor member as an example, the shape of a shield member is not limited to the foregoing example. Another member may be used if it can suppress noise that mixes with an antenna substrate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-019587, filed Feb. 6, 2018 which is hereby incorporated by reference herein in its entirety.

What is claimed is:

1. An antenna module, comprising:
    a circuit substrate;
    a communication coupler having a ring shape or an arc shape and disposed on the circuit substrate, and configured to wirelessly communicate data by electromagnetic coupling with another communication coupler;
    a power transmission coil having a ring shape and disposed on the circuit substrate, and configured to wirelessly transmit power by electromagnetic coupling, wherein the communication coupler and the power transmission coil are disposed in concentric circles;
    a conductive plate disposed on the circuit substrate, and overlapping on at least a portion of the communication coupler as viewed from a direction orthogonal to the circuit substrate; and
    a plurality of conductive plates disposed on the circuit substrate, each conductive plate overlapping a different portion of the communication coupler as viewed from the direction orthogonal to the circuit substrate.

2. The antenna module according to claim 1, wherein the plurality of conductive plates are disposed in order by opening up spaces in a circumferential direction of the communication coupler.

3. The antenna module according to claim 1, wherein the conductive plate has a ring shape, and the communication coupler and the conductive plate are disposed in concentric circles.

4. The antenna module according to claim 3, wherein a slit in a direction different to a circumferential direction of the conductive plate is formed in the conductive plate.

5. The antenna module according to claim 3, wherein a slit in a direction orthogonal to a circumferential direction of the conductive plate is formed in the conductive plate.

6. The antenna module according to claim 1, wherein the communication coupler has a transmission coupler for transmitting data, and a reception coupler of receiving data.

7. The antenna module according to claim 1, wherein the circuit substrate is plate-shaped,
    the communication coupler and the power transmission coil are disposed on the same plane of the circuit substrate, and
    the communication coupler and the conductive plate are disposed on different surfaces of the circuit substrate.

8. The antenna module according to claim 1, wherein the circuit substrate has a cylindrical shape, and the communication coupler and the power transmission coil are disposed in concentric circles on an inner circumferential surface or an outer circumferential surface of the circuit substrate, and
    the communication coupler and the conductive plate are disposed on different surfaces of the circuit substrate.

9. A transmission system having a transmitter and a receiver, wherein
    the transmitter has a first antenna module which is an antenna module according to claim 1, and a transmission circuit configured to input to the first antenna module a signal for transmitting data, and
    the receiver has a second antenna module which is an antenna module according to claim 1, and a reception circuit configured to receive a signal outputted from the second antenna module.

10. The transmission system according to claim 9, wherein the transmission circuit inputs a baseband signal to the first antenna module.

11. The transmission system according to claim 9, wherein the transmission circuit inputs differential signals that are in opposite phases to each other, to the first antenna module.

12. An antenna module, comprising:
- a communication coupler configured to wirelessly communicate data by electromagnetic coupling with another communication coupler;
- a power transmission coil configured to wirelessly transmit power by electromagnetic coupling; and
- a conductive plate overlapping at least a portion of the communication coupler as viewed from a direction orthogonal to a circuit substrate,
- wherein one or more slits are formed in the conductive plate.

13. The antenna module according to claim 12, wherein the communication coupler has a ring shape or an arc shape,
the power transmission coil has a ring shape, and
the communication coupler and the power transmission coil are disposed in concentric circles.

14. The antenna module according to claim 13, wherein the conductive plate has a ring shape, and
the communication coupler and the conductive plate are disposed in concentric circles.

15. The antenna module according to claim 14, wherein the one or more slits are formed in a direction orthogonal to a circumferential direction of the conductive plate.

* * * * *